(12) United States Patent
Kurimura et al.

(10) Patent No.: US 7,261,778 B2
(45) Date of Patent: Aug. 28, 2007

(54) METHOD OF PRODUCING QUASI PHASE-MATCHING CRYSTAL AND QUASI PHASE-MATCHING CRYSTAL

(75) Inventors: Sunao Kurimura, Ibaragi (JP); Masaki Harada, Tokyo (JP)

(73) Assignee: National Institute for Materials Science, Tsukuba-shi, Ibaraki (JP)

( * ) Notice: Subject to any disclaimer, the term of this patent is extended or adjusted under 35 U.S.C. 154(b) by 348 days.

(21) Appl. No.: 10/523,169

(22) PCT Filed: Sep. 18, 2003

(86) PCT No.: PCT/JP03/11880
§ 371 (c)(1),
(2), (4) Date: Mar. 11, 2005

(87) PCT Pub. No.: WO2004/027510
PCT Pub. Date: Apr. 1, 2004

(65) Prior Publication Data
US 2005/0211155 A1   Sep. 29, 2005

(30) Foreign Application Priority Data
Sep. 20, 2002   (JP) .............................. 2002-275999

(51) Int. Cl.
*C30B 29/18* (2006.01)
*G02F 1/35* (2006.01)
*G02B 6/00* (2006.01)

(52) U.S. Cl. ...................... 117/943; 117/930; 359/328; 359/332; 385/3; 385/122; 385/129

(58) Field of Classification Search ................ 117/940, 117/943; 359/328, 332; 385/3, 122, 129
See application file for complete search history.

(56) References Cited

U.S. PATENT DOCUMENTS 5,058,970 A * 10/1991 Schildkraut et al. ........ 359/328

(Continued)

FOREIGN PATENT DOCUMENTS

| JP | 11-212128 A | 8/1999 |
|---|---|---|
| JP | 2002-122898 A | 4/2002 |

OTHER PUBLICATIONS

Tadashi Kurimura et al, Shigai Hacho Henkan o Mezashita Giji Iso Seigo Suishi, Oyo butsuri, *Applied Physics*, vol. 69, No. 5, pp. 548-552 (2000).

*Primary Examiner*—Robert Kunemund
*Assistant Examiner*—G. Nagesh Rao
(74) *Attorney, Agent, or Firm*—Frishauf, Holtz, Goodman & Chick, P.C.

(57) ABSTRACT

Rectangular protruding parts 2 are formed on the surface of one side of a quartz crystal substrate 1; these protruding parts 2 are formed as aggregates of rectangular protruding parts 4 of an even finer pattern. Recessed parts 5 which are lower than the surfaces of the protruding parts 4 are formed between the protruding parts 4; however, the width of these recessed parts 5 is narrow, so that when the protruding parts 4 are viewed on the macroscopic scale, numerous protruding parts 4 are aggregated, and appear to form single protruding parts 2. Such a quartz crystal substrate 1 is clamped between heater blocks from above and below, and the temperature of the quartz crystal substrate is elevated. At the point in time at which this temperature reaches a desired temperature, the substrate 1 is pressed by means of a press. Consequently, stress acts only on the portions corresponding to the protruding parts 4, so that the crystal axis components are inverted only in these portions. These portions with inverted crystal axes grow into the interior portion of the crystal, and are propagated into the interior portion of the crystal, so that the portions corresponding to the protruding parts 4 are connected, thus forming crystal axis inversion regions 6. As a result, crystal axis inversion regions with a desired shape can easily be formed.

13 Claims, 4 Drawing Sheets

U.S. PATENT DOCUMENTS

| | | | |
|---|---|---|---|
| 5,249,191 A * | 9/1993 | Sawaki et al. | 372/22 |
| 5,380,410 A * | 1/1995 | Sawaki et al. | 361/225 |
| 5,619,369 A * | 4/1997 | Yamamoto et al. | 359/332 |
| 6,486,084 B2 * | 11/2002 | Oda et al. | 501/32 |
| 6,738,397 B2 * | 5/2004 | Yamamoto et al. | 372/21 |
| 6,814,800 B2 * | 11/2004 | Kitamura et al. | 117/2 |
| 7,174,059 B2 * | 2/2007 | Oikawa et al. | 385/3 |
| 7,177,070 B2 * | 2/2007 | Kurimura et al. | 359/326 |
| 2001/0025001 A1 * | 9/2001 | Oda et al. | 501/32 |
| 2005/0174629 A1 * | 8/2005 | Kurimura et al. | 359/326 |
| 2005/0213193 A1 * | 9/2005 | Kurimura et al. | 359/326 |
| 2005/0225215 A1 * | 10/2005 | Kurimura et al. | 310/348 |

* cited by examiner

METHOD OF PRODUCING QUASI PHASE-MATCHING CRYSTAL AND QUASI PHASE-MATCHING CRYSTAL

This application is the United States national phase application of International Application PCT/JP2003/011880 filed Sep. 18, 2003.

TECHNICAL FIELD

The present invention relates to a quasi-phase matched quartz crystal manufacturing method and a quasi-phase matched quartz crystal.

BACKGROUND ART

A quasi-phase matched wavelength conversion optical element has been proposed in which a periodic polarization inversion structure is realized by applying a stress to quartz crystal ($SiO_2$), which is a paraelectric material, in the vicinity of the α-β phase transition temperature, so that a periodic twin structure is created (S. Kurimura, R. Batchko, J. Mansell, R. Route, M. Fejer and R. Byer: 1998 Spring Meeting of the Japan Society of Applied Physics Proceedings 28a-SG-18). This is a method in which a quasi-phase matched crystal based on quartz is manufactured by utilizing the twin crystal of quartz to achieve a periodic inversion of the sign of the nonlinear optical constant $d_{11}$ and $d_{22}$.

In the case of quartz, the short absorption edge is a wavelength of approximately 150 nm, and ultraviolet absorption at wavelengths shorter than 200 nm is almost negligible compared to the case of nonlinear optical elements using conventional birefringence phase matching (β-$BaB_2O_4$ and $CsLiB_6O_{10}$, etc.) or nonlinear optical elements using the quasi-phase matching of ferroelectric materials ($LiNbO_3$ and $LiTaO_3$, etc.). Accordingly, light with a wavelength of approximately 193 nm comparable to that of an ArF excimer laser can be generated with high efficiency by second harmonic generation, and semiconductor exposure apparatuses using this have also been proposed (Japanese Patent Application Kokai No. 2002-1222898). The crystal axis inversion period in this case is approximately 0.95 μm.

Lithium niobate and lithium tantalate are universally known as conventional quasi-phase matched crystals, and there has been active research aimed at the direct conversion of light, etc., in wavelength-multiplexed optical communications. However, in the case of lithium niobate and lithium tantalate, optical damage caused by the photorefractive effect is a major problem, so that there have been limits to utilization at a high output power. In the case of quartz, on the other hand, there is no optical damage due to the photorefractive effect, so that use in a sufficiently stable state is possible.

Furthermore, quartz itself is a substance with an established production technology; accordingly, quartz can easily be obtained, and costs can be kept low. Furthermore, the mechanical characteristics and chemical properties of quartz are also among the most superior characteristics found in optical crystals. Moreover, hygroscopic nature, which is conspicuously seen in nonlinear optical crystals using conventional birefringence phase matching (for example, β-$BaB_2O_4$ and $CsLiB_6O_{10}$ mentioned above), is absent from quartz, so that quartz is extremely advantageous from the standpoint of handling. In addition, the $d_{11}$ coefficient is approximately 0.3 pm/V, which is slightly smaller than that seen in common nonlinear optical crystals, so that a sufficient conversion efficiency may be expected.

Various methods are known as methods for manufacturing an artificial twin structure in quartz; however, the hot pressing method has currently been proposed as the most influential method (S. Kurimura, I. Shoji, T. Taira, M. Fejer, Y. Uesu and H. Nakajima: 2000 Fall Meeting of the Japan Society of Applied Physics Proceedings 3a-Q-1). In this method, a periodic step structure is formed on the surface of one side of a quartz crystal substrate, this quartz crystal substrate is clamped between heater blocks from above and below, the temperature of the quartz crystal substrate is elevated, and pressure is applied at the point in time at which this temperature reaches a desired temperature. In this case, since stress acts only on the portions corresponding to the protruding parts of the step structure, the crystal axis is inverted only in these portions. These portions with inverted crystal axes grow to the interior of the crystal and are thus propagated into the crystal, so that a periodic twin lattice that penetrates greatly in the direction of depth can be manufactured. Specifically, stress is concentrated only in the protruding portions, and twins are generated from these areas; these twins gradually grow into the interior, so that a twin structure with a large aspect ratio is manufactured.

An example of such a quartz crystal substrate in which a step structure is formed on the surface of one side will be described with reference to FIG. 4. A step structure is formed on the surface of one side of a quartz crystal substrate 1; as a result, protruding parts 2 that have a solid rectangular shape are formed at a specified interval. These protruding parts 2 have a specified width in the left-right direction in the figure, and the plurality of protruding parts 2 are formed at a spacing that is the same as this width in the left-right direction in the figure. The protruding parts 2 have a rectangular solid shape that is long in the direction of depth in the figure. The direction parallel to this longitudinal direction is taken as the direction of the a axis. Naturally, the a axis is perpendicular to the normal of the quartz crystal substrate 1.

The direction of the c axis of the quartz crystal is perpendicular to the a axis; however, this c axis is slightly inclined with respect to the normal direction of the quartz crystal substrate 1, as indicated by S. Kurimura in the May 2000 issue of the Journal of the Japan Society of Applied Physics. Specifically, the quartz crystal substrate 1 is cut so that the normal and the c axis form a slight angle. Twins tend to be generated as this angle increases; in actuality, however, this angle is kept to an angle of approximately 10 to 20 degrees. As is shown in the figure, the light is incident from the end surface of the quartz crystal substrate 1, and the direction of polarization is the same direction as the direction of the a axis. The light whose wavelength is converted inside the quartz crystal substrate 1 is emitted from the end surface that is located on the opposite end from the incident surface.

An example of the method for manufacturing the protruding parts 2 shown in FIG. 4 will be described below. First, a Cr film is formed to a thickness of approximately 100 nm on the surface of the quartz crystal substrate 1 by a sputtering method. The surface of this film is coated with a positive type resist, and the portions other than the portions that will form the protruding parts 2 are exposed and developed using a semiconductor exposure apparatus such as an i-line stepper. Next, the Cr film is removed using the remaining resist as a mask. Then, wet etching is performed by means of hydrofluoric acid using the remaining resist film and Cr film as a mask, so that a step structure with a depth of about a few microns is manufactured. As a result, a quartz crystal substrate 1 is completed which has a step structure with protruding parts 2 such as those shown in FIG. 4 formed on the surface. Furthermore, the Cr film may either be stripped or not stripped prior to pressing.

It is convenient in a wavelength conversion device that the angle between the c axis and the normal of the quartz crystal substrate be as small as possible; however, the stress required for twin formation is increased in this case. Accordingly, the quartz crystal is cut so that the angle between the c axis and the normal of the quartz crystal substrate is an angle ranging from a few degrees to approximately 20 degrees.

Furthermore, although this is not a publicly known technique, the use of dry etching is also conceivable instead of the wet etching mentioned above. In this case, for example, a Cr film is first formed to a thickness of approximately 100 nm on the surface of the quartz crystal substrate 1 by a sputtering method. The surface of this film is coated with a positive type resist, and the portions other than the portions that will form the protruding parts 2 are exposed and developed using a semiconductor exposure apparatus such as an i-line stepper. Then, the Cr film is removed using the remaining resist as a mask. Subsequently, dry etching such as RIE or ICP is performed using the remaining resist film and Cr film as a mask, so that a step structure with a depth of about a few microns is manufactured. Finally, a quartz crystal substrate 1 which has a step structure with protruding parts 2 such as those shown in FIG. 4 formed on the surface is completed by removing the resist film and Cr film.

In order to obtain a quartz crystal substrate which has a twin structure, a pressing apparatus which has a cartridge heater is used, the quartz crystal substrate 1 is clamped from above and below and heated to the vicinity of the phase transition temperature, and pressing is performed when the desired temperature is reached. Consequently, a stress acts only on the protruding parts 2, so that the crystal axis components are inverted only in these parts. Then, the portions in which the crystal axes are inverted grow into the interior of the crystal and propagate into the interior of the crystal, so that a periodic twin lattice that penetrates greatly in the direction of depth can be manufactured. A high aspect ratio in the direction of depth can be created by controlling the pressing time and changes in the pressure over time.

In the above description, a step structure was formed on the surface of the quartz crystal substrate 1; however, it would also be conceivable to polish the surface of the quartz crystal to a planar surface, and to form steps in the pressing surface on the side of the press (this is not a publicly known technique). If a ceramic such as $Si_3N_4$ is used as the pressing surface on the side of the press, a periodic step structure can be created using the lithographic technique and working by dry etching described above.

The boundaries of the inversion of the crystal axes can be observed by immersing the quartz crystal substrate that has been pressed as described above in hydrofluoric acid for several minutes, and utilizing the differences in the etching rate. FIG. 5 shows the quartz crystal substrate 1 as seen from the normal direction of the substrate. The areas surrounding the rectangular protruding parts 2 formed on the surface of the quartz crystal substrate 1 are cut away by dry etching or the like. Accordingly, in the case of pressing by the flat surface of the press, the rectangular portions corresponding to the protruding parts 2 should undergo a crystal axis inversion; in actuality, however, triple symmetry about the c axis of the quartz crystal is reflected, so that the crystal axis inversion regions 3 are often produced with a hexagonal pattern as indicated by the hatching in the figure.

Accordingly, in cases where the step period is short, e.g., around a few microns, the crystal axis inversion regions 3 do not spread throughout the entire protruding parts 2 of the steps, and stop at an intermediate point in a hexagonal shape as shown in the figure, so that crystal axis inversion does not occur to the ends of the step pattern (protruding parts 2). In such cases, if laser light which generally has a spread with a radius of several tens of microns or more is caused to be incident, only a very small part of this laser light undergoes wavelength conversion.

Meanwhile, the crystal axis inversion regions of the quartz crystal tend to be produced from the ends of the step pattern (protruding parts 2) where the stress is concentrated. Accordingly, in cases where the step pattern has a long period, e.g., several tens of microns, crystal axis inversion regions are formed only at the ends of the step pattern, and are not formed in the central portions, which is a problem in that the desired twin periodic structure cannot be obtained.

Furthermore, as a result of the concentration of an extremely large stress in the four corners of the protruding parts 2 of the rectangular pattern, a phenomenon may occur in which crystal axis inversion regions are produced in portions outside of the protruding parts 2. When such a phenomenon occurs, especially in cases where the step pattern has a short periodic structure, these portions may be merged with adjacent pattern portions, so that the periodic structure is destroyed.

The present invention was devised in light of such circumstances; the object of the present invention is to provide a method for manufacturing a quasi-phase matched quartz crystal in which crystal axis inversion regions with a desired shape can easily be formed, and a quasi-phase matched quartz crystal which is formed by one example of this method.

DISCLOSURE OF THE INVENTION

The first invention that is used to achieve the object described above is a method for manufacturing a quasi-phase matched quartz crystal comprising a step in which a quartz crystal on which surface step working has been performed so that this quartz crystal has protruding parts consisting of a periodic or arbitrary pattern is subjected to the application of pressure by pressing a planar substrate at a specified temperature, thus inverting the crystal axes in the portions corresponding to the protruding parts, this quasi-phase matched quartz crystal manufacturing method being characterized in that the protruding parts consisting of a periodic or arbitrary pattern are composed of aggregates of protruding parts of an even finer pattern.

In this invention, protruding parts consisting of a periodic or arbitrary pattern that are formed in order to invert the crystal axes are formed by aggregates of protruding parts of an even finer pattern. Specifically, a plurality of protruding parts of a fine pattern are gathered so that when these protruding parts are viewed on the macroscopic scale, it appears that protruding parts consisting of a single periodic or arbitrary pattern are formed. Surfaces that are lower than the surfaces of the protruding parts (i.e., recessed parts) are formed at the boundaries between the fine pattern portions. Accordingly, in a case where the protruding portions of such a pattern are pressed by the flat surface of a press, the individual protruding portions of the fine pattern are pressed by the flat surface of the press. Consequently, it is possible to avoid the failure of the crystal axis inversion regions to spread throughout the entire protruding parts consisting of the periodic or arbitrary pattern, or conversely, the failure to obtain the desired twin periodic structure as a result of a concentrated stress being generated only in the corner portions of the protruding parts.

No stress is applied to the recessed parts (surfaces that are lower than the surfaces of the protruding parts) that are located between the protruding parts of the fine pattern; however, if the width of these recessed parts is made sufficiently narrow, then portions with inverted crystal axes are also formed in the interior portions of the crystal corresponding to these recessed parts when the portions with inverted crystal axes that are generated in the protruding parts grow into the interior portions of the crystal and are propagated along the depth into the crystal, so that the respective portions with inverted crystal axes are connected in the interior portions of the crystal, thus making it possible to form portions with inverted crystal axes that have a desired shape.

The second invention that is used to achieve the object described above is a method for manufacturing a quasi-phase matched quartz crystal comprising a step in which a quartz crystal substrate whose surface has been polished to a flat surface is subjected to the application of pressure by being pressed at a specified temperature by a surface that has been subjected to surface step working so that this surface has protruding parts consisting of a periodic or arbitrary pattern, thus inverting the crystal axes of the portions of the quartz crystal that correspond to the protruding parts, this quasi-phase matched quartz crystal manufacturing method being characterized in that the protruding parts consisting of the periodic or arbitrary pattern are composed of aggregates of protruding parts of an even finer pattern.

This invention relates to a method in which portions with inverted crystal axes are formed in portions of the quartz crystal substrate that contact protruding parts by forming the surface of the quartz crystal substrate as a polished surface, and forming protruding parts on the surface that presses the quartz crystal substrate. In this invention, the protruding parts formed on the surface that presses the quartz crystal substrate are formed from aggregates of protruding parts of an even finer pattern; consequently, according to the same principle as that of the first invention described above, it is possible to avoid the failure of the crystal axis inversion regions to spread throughout the entire protruding parts consisting of the periodic or arbitrary pattern, or conversely, the failure to obtain the desired twin periodic structure as a result of a concentrated stress being generated only in the corner portions of the protruding parts.

The third invention that is used to achieve the object described above is the first invention or second invention, which is characterized in that the shape of the protruding parts of the even finer pattern is a square shape or rectangular shape.

Generally, protruding parts consisting of a periodic or arbitrary pattern often have a rectangular shape as seen in a plan view. Accordingly, such protruding parts consisting of a periodic or arbitrary pattern can easily be formed as aggregates of protruding parts of an even finer pattern by making the shape of such protruding parts of an even finer pattern a square shape or rectangular shape. Furthermore, if this even finer pattern is formed with a square shape or rectangular shape, the special feature of easy working can be obtained.

The fourth invention that is used to achieve the object described above is the first invention or second invention, which is characterized in that the shape of the protruding parts of the even finer pattern is a hexagonal shape.

In cases where a quartz crystal substrate is pressed as described above, 3-fold symmetry around the c axis of the quartz crystal is reflected, so that the crystal axis inversion regions are often produced in a pattern that has a hexagonal shape. Accordingly, if the shape of the protruding parts of the even finer pattern is made a hexagonal shape, stress can be applied to the portions of the pattern that correspond to the production of crystal axis inversion regions, thus making it possible to form crystal axis inversion regions in an efficient manner.

The fifth invention that is used to achieve the object described above is any of the first through fourth inventions, which is characterized in that the ends of the periodic pattern are formed with a shape that conforms to the twin boundaries of the quartz crystal.

In this invention, since the ends of the periodic pattern are formed with a shape that conforms to the twin boundaries of the quartz crystal, stress can be applied to the portions of the pattern that correspond to the production of crystal axis inversion regions, so that the spread of the crystal axis inversion regions to the outside of the pressing pattern can be suppressed. Furthermore, if this is done, the shape of the pattern is close to a hexagonal shape; here, since more numerous corner parts can be formed than in cases where the shape of the pattern is a rectangular shape, the concentration of stress can be reduced.

The sixth invention that is used to achieve the object described above is a quasi-phase matched quartz crystal which is characterized in that surface step working is performed on the surface of one side so that this surface has protruding parts consisting of a periodic or arbitrary pattern, and the protruding parts consisting of this periodic or arbitrary pattern are composed of aggregates of protruding parts of an even finer pattern.

In this invention, crystal axis inversion regions can be formed using the method of the first invention described above. Accordingly, it is possible to avoid the failure of the crystal axis inversion regions to spread throughout the entire protruding parts consisting of the periodic or arbitrary pattern, or conversely, the failure to obtain the desired twin periodic structure as a result of a concentrated stress being generated only in the corner portions of the protruding parts.

BEST MODE FOR CARRYING OUT THE INVENTION

Figure 1:
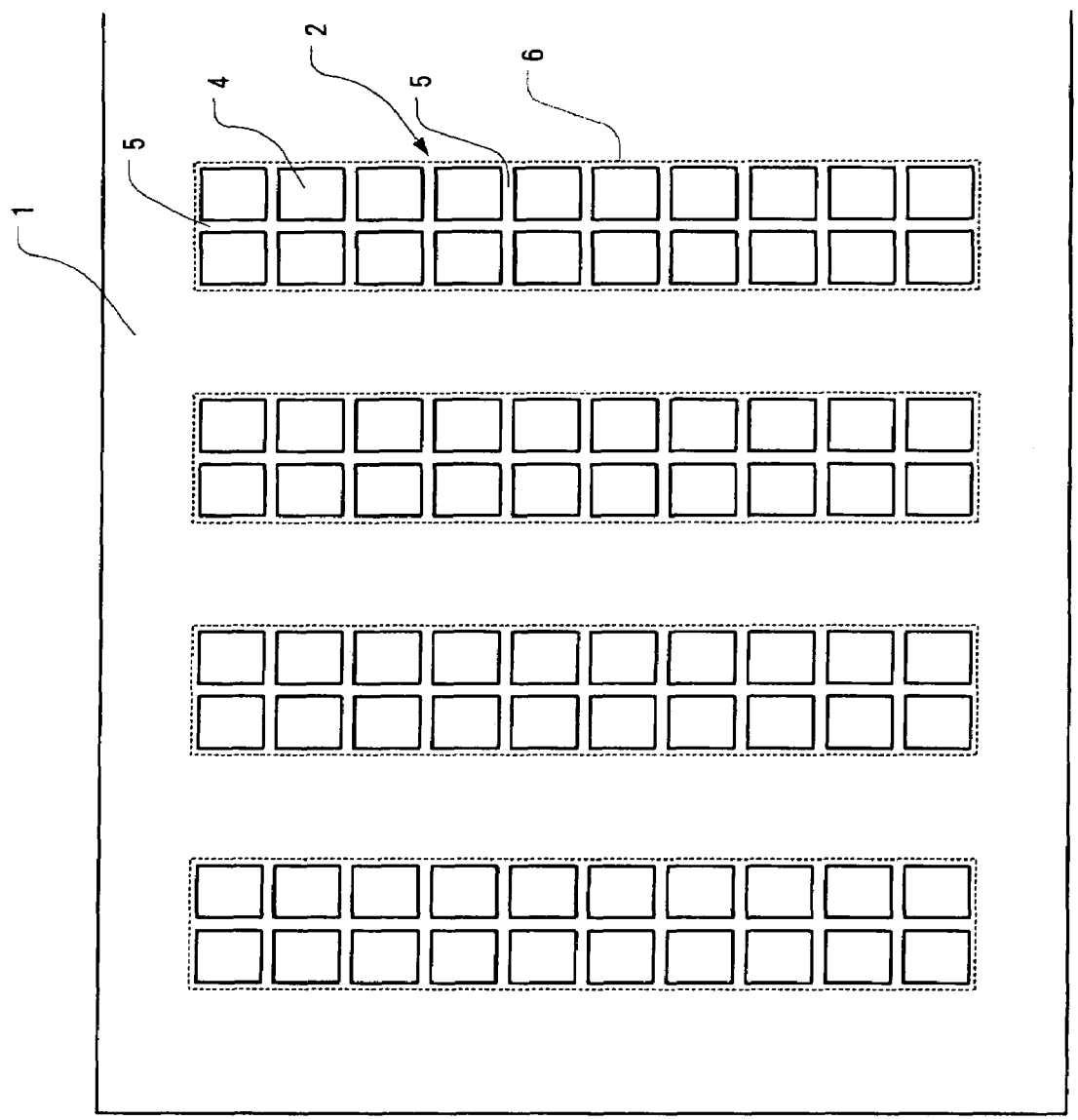
FIG. 1 is a diagram which shows a substrate for a quasi-phase matched quartz crystal constituting a first example of a working configuration of the present invention, as seen from the normal direction of the substrate.
Figure 4:
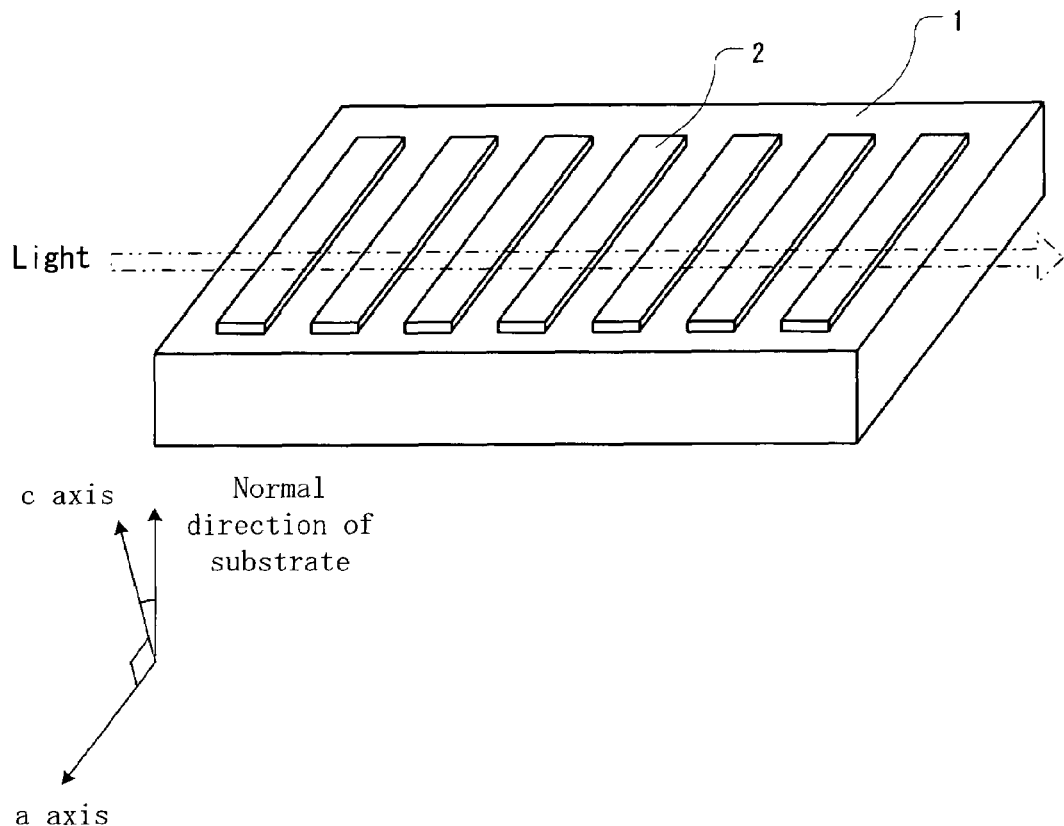
FIG. 4 is a diagram showing an example for a quartz crystal substrate in which a step structure is formed on the surface of one side on which a conventional hot pressing method is to be used.
Figure 5:
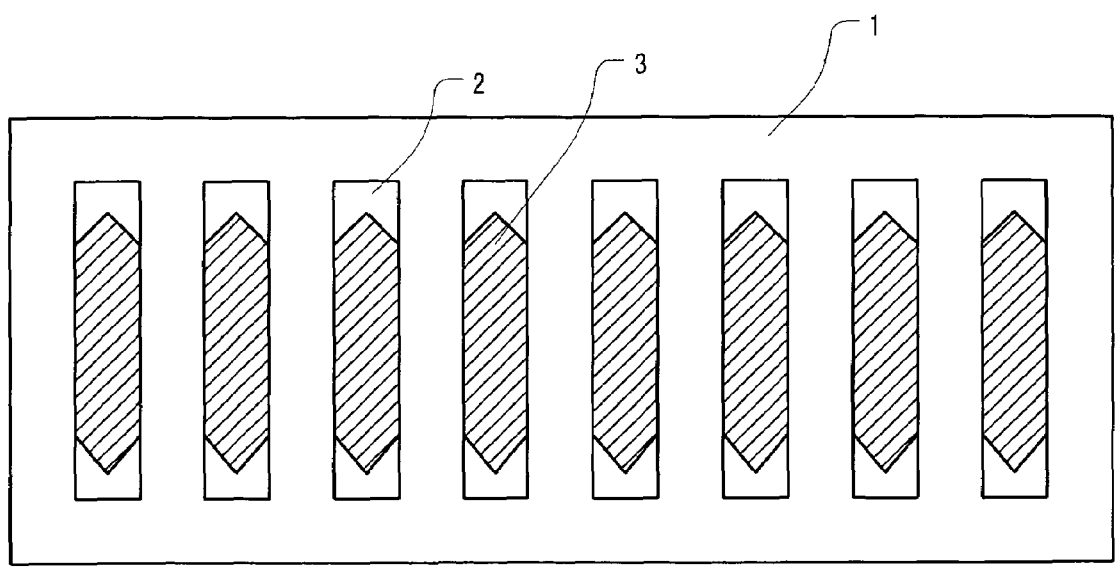
FIG. 5 is a diagram which shows the quartz crystal substrate shown in FIG. 4 as seen from the normal direction of the substrate; this diagram shows the shape of the crystal axis inversion regions that are formed.

Examples of working configurations of the present invention will be described below with reference to the figures. FIG. 1 is a diagram which shows a substrate of a quasi-phase matched quartz crystal constituting a first example of a working configuration of the present invention, as seen from the normal direction of the substrate, and corresponds to FIG. 5 showing a conventional example. There is no difference between the overall construction of this quasi-phase matched quartz crystal substrate and that of the conventional example shown in FIG. 4.

In FIG. 1, rectangular protruding parts 2 are formed on the surface on one side of the quartz crystal substrate 1. These protruding parts 2 differ from those in the conventional example shown in FIG. 5 in that these protruding parts are formed as aggregates of even finer rectangular protruding parts 4. Specifically, when viewed on the microscopic scale, it is seen that recessed parts 5 which are lower than the surfaces of the protruding parts 4 are formed between the protruding parts 4. However, the width of these recessed parts 5 is narrow, so that when viewed on the macroscopic scale, numerous protruding parts 4 are aggregated and appear to form single protruding parts 2.

The protruding parts 2 are formed across the portions in which it is desired to invert the crystal axes of the quartz crystal. Such a quartz crystal substrate 1 is clamped between heater blocks from above and below, and the temperature of the quartz crystal substrate is elevated. At the point in time at which this temperature reaches a desired temperature, the substrate is pressed by means of a press. Consequently, stress acts only on the portions corresponding to the protruding parts 4, and the crystal axis components are inverted only in these portions. These portions with inverted crystal axes grow into the interior portion of the crystal, and are propagated into the interior portion of the crystal, so that a periodic twin lattice which penetrates greatly in the direction of depth can be manufactured.

When the portions with inverted crystal axes are propagated into the interior portions of the crystal (the portions beneath the protruding parts 2 of the quartz crystal substrate 1), propagation also takes place in the portions of the recessed parts 5, so that portions in which the crystal axes are inverted are formed in a form in which the recessed parts 5 between the respective protruding parts 4 are embedded and connected in the interior portions of the crystal. The inverted regions are ultimately formed over all desired regions, and these portions grow toward the opposite surface of the quartz crystal substrate 1 along the direction of the c axis. Specifically, the substantially rectangular portions 6 indicated by broken lines in FIG. 1 constitute crystal axis inversion regions. Conversely speaking, the width of the recessed parts 5 must be set at a width which is such that the crystal axis inversion regions are connected in the interior portions of the crystal by the propagation of the portions with inverted crystal axes when pressing is performed. In actuality, it is desirable that this width be a few microns or less.

Furthermore, it is also possible to vary the width of the portions with inverted crystal axes that extend from the protruding parts 4 by controlling the temperature during pressing and the time pattern of the applied load. Thus, varying the width of the recessed parts 5 or controlling the temperature during pressing and the time pattern of the applied load causes the portions of the recessed parts 5 to be embedded, so that the portions with inverted crystal axes are connected. Furthermore, it is also possible to change the length-to-width ratio of the protruding parts 4 so that the portions with inverted crystal axes are more easily connected.

In this invention, the portions that are subjected to pressure by pressing are divided into fine protruding parts 4; accordingly, the respective protruding parts 4 equally receive the pressure from the press. Consequently, it is possible to avoid the failure of the crystal axis inversion regions to spread throughout the entire protruding parts consisting of the periodic or arbitrary pattern, or conversely, the failure to obtain the desired twin periodic structure as a result of a concentrated stress being generated only in the corner portions of the protruding parts.

Furthermore, in this example, the fine protruding parts 4 are constructed with a rectangular shape. If the fine protruding parts 4 are thus constructed with a rectangular shape or square shape, the rectangular protruding parts 2 as a whole can easily be constructed.

Figure 2:
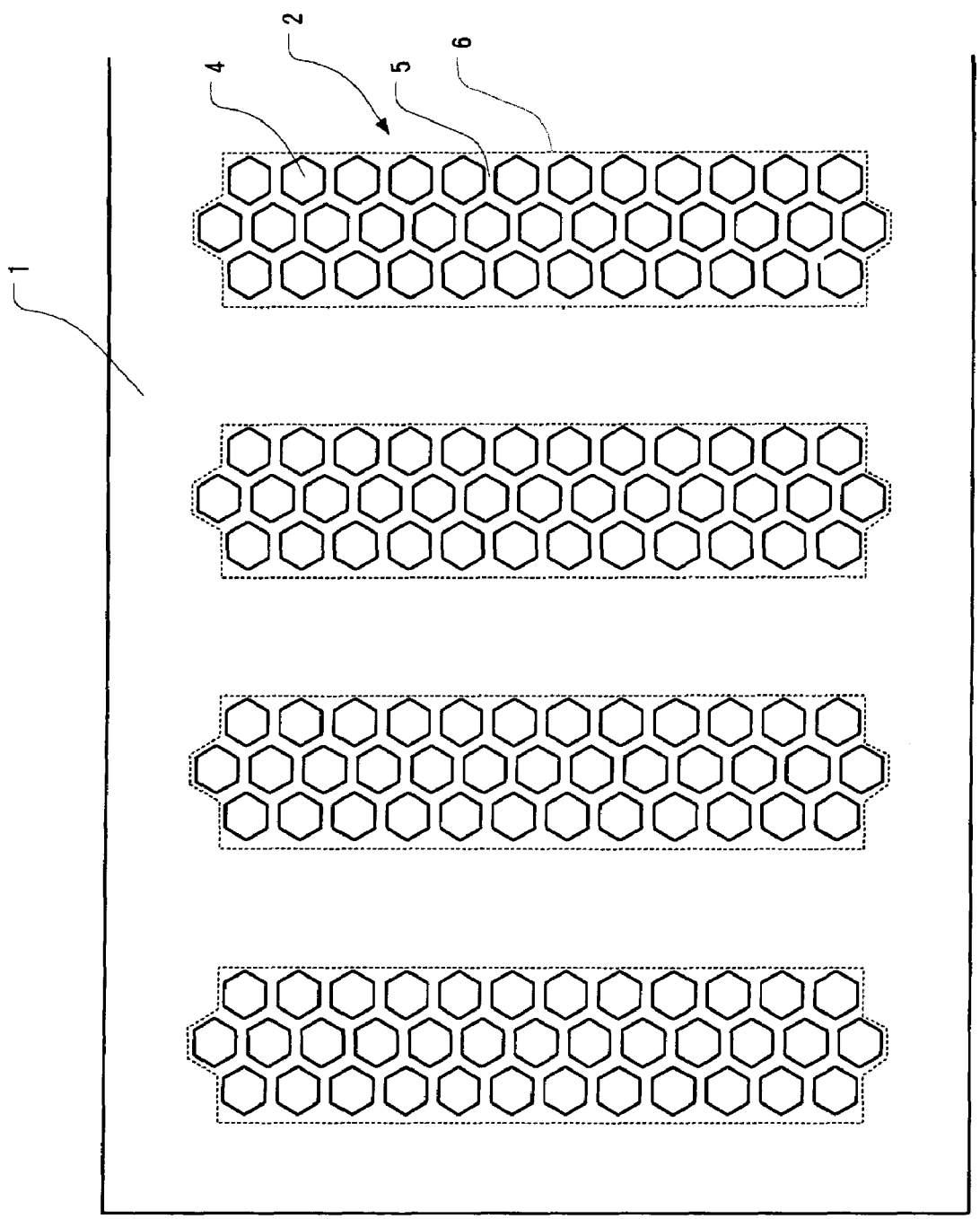
FIG. 2 is a diagram which shows a substrate for a quasi-phase matched quartz crystal constituting a second example of a working configuration of the present invention, as seen from the normal direction of the substrate.

FIG. 2 is a diagram showing a quasi-phase matched quartz crystal substrate constituting a second example of a working configuration of the present invention, as seen from the normal direction of the substrate; this diagram corresponds to FIG. 1. In this example, the protruding part 2 corresponding to portions in which it is desired to form portions with inverted crystal axes are formed from microscopic protruding parts 4 that have a hexagonal shape, and narrow recessed parts 5 are formed between these microscopic protruding parts 4. Specifically, this example has no difference from the first example, except for the fact that the protruding parts 4 are formed with a hexagonal shape in this example, while the protruding parts 4 in the first example are formed with a rectangular shape.

If a hot pressing method is applied to a quartz crystal substrate 1 formed in this manner, the portions 6 indicated by broken lines in FIG. 2 constitute crystal axis inversion regions in the interior portions of the crystal. Thus, the example shown in FIG. 2 basically has the same effect as the example shown in FIG. 1; however, since the microscopic protruding parts 4 have a hexagonal shape, the quartz crystal substrate 1 can be pressed in a form that matches the triple symmetry about the c axis of the quartz crystal.

Figure 3:
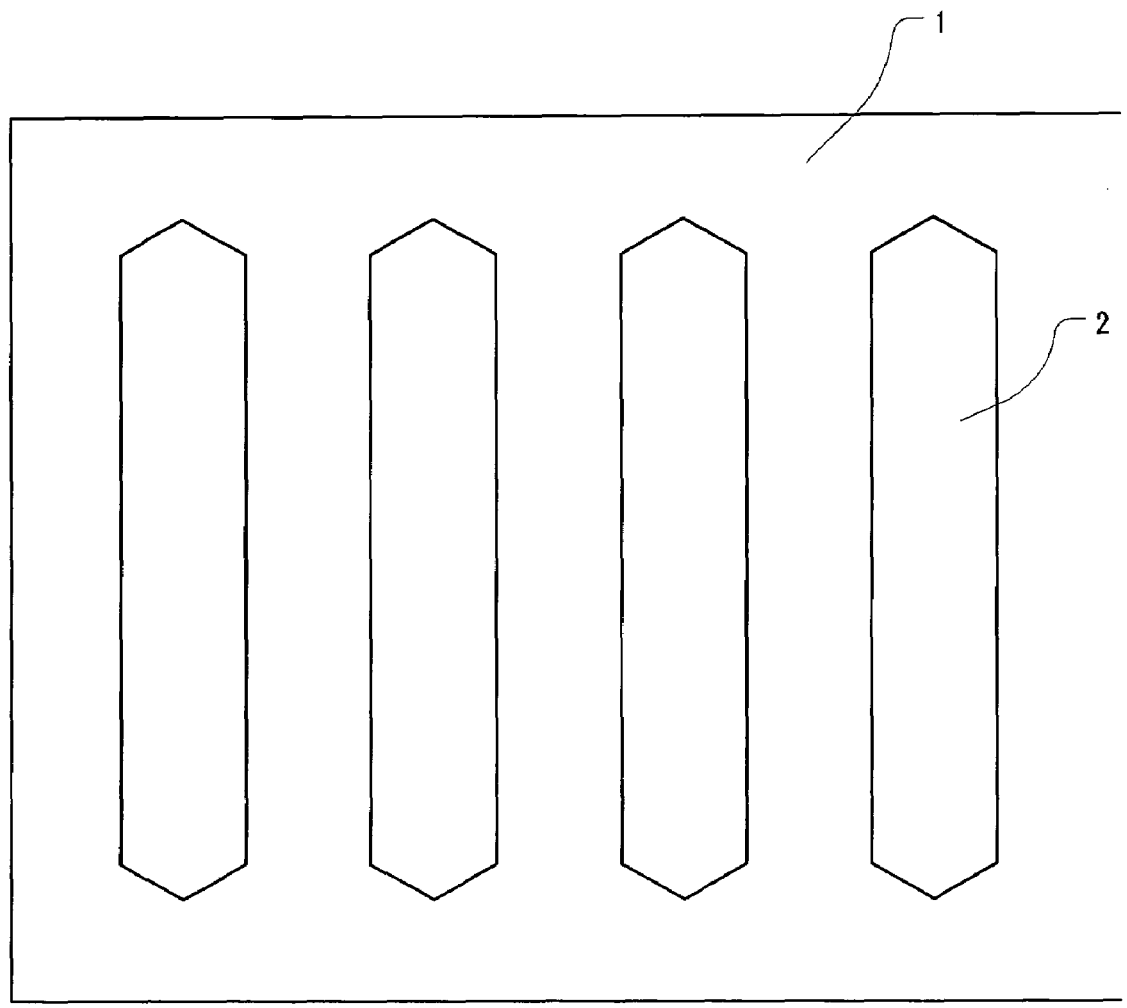
FIG. 3 is a diagram which shows a substrate for a quasi-phase matched quartz crystal constituting a third example of a working configuration of the present invention, as seen from the normal direction of the substrate.

FIG. 3 is a diagram showing a quasi-phase matched quartz crystal substrate constituting a third example of a working configuration of the present invention, as seen from the normal direction of the substrate; this diagram also corresponds to FIG. 1. In this working configuration, the protruding parts 2 are not divided into a fine pattern. However, the four corners of the protruding parts 2 are formed with a hexagonal shape, so that the ends of the protruding parts 2 are formed with a shape that conforms to the twin boundaries of the quartz crystal. As a result, the quartz crystal substrate 1 can be pressed in a form that matches the triple symmetry about the c axis of the quartz crystal. Accordingly, the crystal axis inversion regions tend not to be formed in a shape that bulges outward from the protruding parts 2. Furthermore, compared to a case in which the protruding parts 2 are formed with a rectangular shape, the number of corner portions is increased; as a result, the concentration of stress is alleviated. As in the respective cases of FIG. 1 and FIG. 2, the protruding parts 2 in FIG. 3 may also be formed as aggregates of fine protruding parts.

Furthermore, in all of the working configurations described above, protruding parts constituting a step structure are formed on the surface of one side of the quartz crystal substrate 1. There is probably no need to explain that a similar effect can be obtained by making the surface of the quartz crystal substrate 1 a polished surface, and pressing this surface with a step structure such as that shown in FIGS. 1 through 3 formed on the pressing surface of the press, instead of using the procedure described above.

What is claimed is:

1. A method for manufacturing a quasi-phase matched quartz crystal comprising a step in which a quartz crystal on which surface step working has been performed so that this quartz crystal has protruding parts consisting of a periodic or arbitrary pattern is subjected to the application of pressure by pressing a planar substrate at a specified temperature, thus inverting the crystal axes in the portions corresponding to the protruding parts, this quasi-phase matched quartz crystal manufacturing method being characterized in that the protruding parts consisting of a periodic or arbitrary pattern are composed of aggregates of protruding parts of an even finer pattern.

2. A method for manufacturing a quasi-phase matched quartz crystal comprising a step in which a quartz crystal substrate whose surface has been polished to a flat surface is subjected to the application of pressure by being pressed at a specified temperature by a surface that has been subjected to surface step working so that this surface has protruding parts consisting of a periodic or arbitrary pattern, thus inverting the crystal axes of the portions of the quartz crystal that correspond to the protruding parts, this quasi-phase matched quartz crystal manufacturing method being characterized in that the protruding parts consisting of the periodic or arbitrary pattern are composed of aggregates of protruding parts of an even finer pattern.

3. The method for manufacturing a quasi-phase matched quartz crystal according to claim 1, which is characterized in that the shape of the protruding parts of the even finer pattern is a square shape or rectangular shape.

4. The method for manufacturing a quasi-phase matched quartz crystal according to claim 1, which is characterized in that the shape of the protruding parts of the even finer pattern is a hexagonal shape.

5. The method for manufacturing a quasi-phase matched quartz crystal according to claim 1, which is characterized in that the ends of the periodic pattern are formed with a shape that conforms to the twin boundaries of the quartz crystal.

6. A quasi-phase matched quartz crystal which is characterized in that surface step working is performed on the surface of one side so that this surface has protruding parts consisting of a periodic or arbitrary pattern, and the protruding parts consisting of this periodic or arbitrary pattern are composed of aggregates of protruding parts of an even finer pattern.

7. The method for manufacturing a quasi-phase matched quartz crystal according to claim 2, which is characterized in that the shape of the protruding parts of the even finer pattern is a square shape or rectangular shape.

8. The method for manufacturing a quasi-phase matched quartz crystal according to claim 2, which is characterized in that the shape of the protruding parts of the even finer pattern is a hexagonal shape.

9. The method for manufacturing a quasi-phase matched quartz crystal according to claim 2, which is characterized in that the ends of the periodic pattern are formed with a shape that conforms to the twin boundaries of the quartz crystal.

10. The method for manufacturing a quasi-phase matched quartz crystal according to claim 3, which is characterized in that the ends of the periodic pattern are formed with a shape that conforms to the twin boundaries of the quartz crystal.

11. The method for manufacturing a quasi-phase matched quartz crystal according to claim 4, which is characterized in that the ends of the periodic pattern are formed with a shape that conforms to the twin boundaries of the quartz crystal.

12. The method for manufacturing a quasi-phase matched quartz crystal according to claim 7, which is characterized in that the ends of the periodic pattern are formed with a shape that conforms to the twin boundaries of the quartz crystal.

13. The method for manufacturing a quasi-phase matched quartz crystal according to claim 8, which is characterized in that the ends of the periodic pattern are formed with a shape that conforms to the twin boundaries of the quartz crystal.

* * * * *